United States Patent [19]

Mera et al.

[11] 4,172,938
[45] Oct. 30, 1979

[54] PROCESS FOR PRODUCING POLYAMIDES WITH LACTAM OR UREA SOLVENT AND CACL$_2$

[75] Inventors: Hiroshi Mera, Hino; Yasuo Nakagawa; Masahiro Yamaguchi, both of Hachioji; Mitsuyuki Ohno, Hino, all of Japan

[73] Assignee: Teijin Limited, Osaka, Japan

[21] Appl. No.: 806,160

[22] Filed: Jun. 13, 1977

[30] Foreign Application Priority Data

Jun. 23, 1976 [JP] Japan .................................. 51-73278

[51] Int. Cl.$^2$ .............................................. C08G 69/28
[52] U.S. Cl. .................................... 528/336; 528/312; 528/314; 528/315; 528/319; 528/331; 528/341; 528/348
[58] Field of Search ............. 260/78 R; 528/348, 336, 528/331, 312, 319, 314, 341, 315

[56] References Cited

U.S. PATENT DOCUMENTS

| | | | |
|---|---|---|---|
| 3,063,966 | 11/1962 | Kwolek et al. | 260/78 R |
| 3,966,686 | 6/1976 | Asakura et al. | 260/78 R |

FOREIGN PATENT DOCUMENTS

51-122594 11/1974 Japan.
49-109099 9/1976 Japan.

OTHER PUBLICATIONS

Fiber Forming Aromatic Polyamides, Man Made Fibers, vol. 2, (1968), p. 301.
Polymer Science (U.S.S.R.) Federov et al., 12, #10-12, pp. 2475-2491 (1970).
Polimery-Chodkowski et al. (1971) pp. 514-515, 16 (11).

*Primary Examiner*—Harold D. Anderson
*Attorney, Agent, or Firm*—Burgess, Ryan and Wayne

[57] ABSTRACT

An aromatic polyamide having a high degree of polymerization is produced by polymerizing
(A) a mixture of an aromatic diamine of the formula (1):

$$H_2N-Ar_1-NH_2 \qquad (1)$$

and an aromatic dicarboxylic acid dihalide of the formula (2):

$$XOC-Ar_2-COX \qquad (2)$$

(B) a mixture of the aromatic diamine of the formula (1), the aromatic dicarboxylic acid dihalide of the formula (2) and a hydrogen halide salt of an aromatic amino carboxylic acid halide of the formula (3):

$$XH \cdot H_2N-Ar_3-COX \qquad (3)$$

or
(C) the hydrogen halide salt of the aromatic amino carboxylic acid halide of the formula (3) alone, wherein $Ar_1$, $Ar_2$ and $Ar_3$ respectively represent, independently from each other, a divalent aromatic or heteroaromatic radical having two bonds extending from the radical essentially coaxially or in parallel to each other or a divalent heteroaromatic or heterocyclic radical having two bonds extending from the radical with a maximum spacing from each other, and X represents a halogen atom, to a condensation polymerization in a medium of at least one solvent selected from N-methyl-2-pyrrolidone containing 1.5% or more but less than 5% by weight of calcium chloride, and dimethyl acetamide, N-methylcaprolactam and tetramethylurea respectively containing 1.5 to 8% by weight of the calcium chloride.

11 Claims, No Drawings

PROCESS FOR PRODUCING POLYAMIDES WITH LACTAM OR UREA SOLVENT AND CACL₂

The present invention relates to a process for producing an aromatic polyamide. More particularly, the present invention relates to a process for producing an aromatic polyamide having a high degree of polymerization which is useful for producing fibers, films, fibrids and other shaped articles.

The so-called wholly aromatic polyamide resins have excellent thermal properties, for example, a high melting point and an excellent heat resistance, and excellent mechanical properties, for example, a high tenacity and an excellent abrasion resistance. Therefore, such resins are useful as materials for producing fibers, filaments, fibrids, thread, films and other shaped articles. The poly-p-phenylene terephthalamide type polymers are especially very useful for the above-mentioned uses.

Conventional aromatic polyamides can be produced by the condensation polymerization of an aromatic diamine and an aromatic divalent acid halide in accordance with a low temperature solution polymerization method (Japanese Patent Application Publication No. 35-14399 (1960) equivalent to U.S. Pat. No. 3,063,966), an interfacial polymerization method (Japanese Patent Application Publication No. 35-13249 (1960) equivalent to U.S. Pat. No. 3,006,899) or an oligomer polymerization method (Japanese Patent Application Publication No. 47-10863 (1972) equivalent to U.S. Pat. No. 3,640,970).

However, it is known that the poly-p-phenylene terephthalamide type polymers consisting essentially of the recurring units wherein the amino radicals extending from the benzene ring radicals are located coaxially or in parallel to each other along the polymer chain, are insoluble or difficult to dissolve in conventional organic solvents. Accordingly, it has been believed that the above-mentioned type of aromatic polyamides having a high degree of polymerization are difficult to be prepared by the conventional interfacial or oligomer polymerization method. It is known that in the case where the conventional low temperature solution polymerization method is applied to the preparation of the poly-p-phenylene terephthalamide type polymers most of the polar organic solvents, for example, dimethylacetamide (DMA), N-methyl-2-pyrrolidone (NMP), N-methylcaprolactam (NMC) and tetramethylurea (TMU) are not effective for producing a polymer which has a high degree of polymerization. However, it is also known that only hexamethyl phosphoramide (HMPA) or mixtures of the hexamethylphosphoramide with one or more to the other polar organic solvents are effective for the preparation of the poly-p-phenylene terephthalamide type polymers having a high degree of polymerization.

It is well known, for example, from Japanese Patent Application Publication No. 35-16027 (1960) equivalent to U.S. Pat. No. 3,068,188), that the dissolving property of the polar organic solvents can be enhanced by the addition of a halide of a metal belonging to the I group and the II group of the Periodic Table. The production of the poly-p-phenylene terephthalamine type polymers in the polar organic solvent containing the above-mentioned metal halide, has been studied. However, a polymer having a high degree of polymerization has not yet been obtained from such production. This fact is obvious from L. B. Sokolov et al, Vysokomol, soyed. A12-:No. 10, pages 2185-2198, 1970.

Generally, in the preparation of the aromatic polyamides usable for producing shaped articles, the degree of polymerization of the polyamides is set forth in response to the form of the shaped article and to the properties which the shaped article is required to have. With regard to the case of the aromatic polyamides, particularly, the poly-p-phenylene terephthalamide type polymers to be utilized for producing fibers or filaments, Japanese Patent Application Laying-open No. 47-43119 (1972) equivalent to U.S. Pat. No. 3,869,430) states that the polyamides are required to have a relatively high degree of polymerization, for example, represented in terms of inherent viscosity (logarithmic viscosity) ($\eta$inh) of 4 or more. Accordingly, in the conventional method for the preparation of the aromatic polyamides for producing fibers or filaments with a high degree of polymerization, it is required to use the hexamethylphosphoramide as the polymerization medium. However, recently, it was discovered that the hexamethylphosphoramide is toxic and harmful to human health ("Chemical and Engineering News," Sept. 29, page 17, 1975).

Further, the increase in the degree of polymerization of the aromatic polyamide during the polymerization process results in an increase in the viscosity of the polymerization mixture. This high viscosity causes difficulty in the continuing of the polymerization process to a further degree.

For example, in the case where the poly-p-phenylene terephthalamide type polymer is prepared in accordance with a low temperature solution polymerization method, the polymerization mixture has a relatively low viscosity before beginning the polymerization process. However, after starting the polymerization process, the viscosity of the polymerization mixture rapidly increases to such an extend that the polymerization mixture attains a state of gel, that is, an agar-like or cheesy state, and then it becomes difficult to obtain a uniform agitation of the polymerization mixture. Accordingly, in order to uniformly agitate the polymerization mixture during the polymerization process, it is necessary to use a high-powered agitator or kneader during the initial stage of the polymerization process and a combination of different types of agitators or kneaders in the later stage of the polymerization process so as to overcome the difficulty in agitation due to the changing viscosity and to the changing phase of the polymerization mixture. Such requirement for the special agitating device results in an increase in the cost of carrying out the polymerization process.

The above-mentioned difficulty, in the polymerization process can be reduced by preventing a rapid change in the phase of the polymerization mixture. For this purpose, it is known that the method of Japanese Patent Application Laying-open No. 50-128793 (1975) is effective. In this method, the polymer is prepared by reacting two kinds of component prepolymers with each other in a polymerization medium. Also the reaction between a component prepolymer and a component monomer is effective for the above-mentioned purpose. However, these methods are still inadequate for completely eliminating the difficulty in agitation due to the rapid change in the viscosity of the polymerization mixture.

An object of the present invention is to provide a process for producing an aromatic polyamide having a high degree of polymerization without the employment of a harmful polymerization medium.

Another object of the present invention is to provide a process for producing an aromatic polyamide having a high degree of polymerization, which can be carried out smoothly even when the viscosity of the polymerization mixture is high.

The above objects can be accomplished by the process of the present invention, which comprises subjecting (A) a mixture of at least one aromatic diamine of the formula (1):

$$H_2N—Ar_1—NH_2 \qquad (1)$$

and at least one aromatic dicarboxylic acid dihalide of the formula (2):

$$XOC—Ar_2—COX \qquad (2)$$

(B) a mixture of at least one of the aromatic diamines of the formula (1), at least one of the aromatic dicarboxylic acid dihalides of the formula (2) and at least one hydrogen halide salt of an aromatic amino carboxylic acid halide of the formula (3);

$$XH.H_2N—Ar_3—COX \qquad (3)$$

or (C) at least one of the hydrogen halide salts of the aromatic amino carboxylic acid halides of the formula (3) alone, wherein $Ar_1$, $Ar_2$ and $Ar_3$ respectively represent, independently from each other, a divalent aromatic or heteroaromatic radical having two essentially coaxial or parallel oppositely directed, chain extending bonds or a divalent heteroaromatic or a heterocyclic radical having two bonds extending from the radical with a maximum spacing from each other, and X represents a halogen atom, to a condensation polymerization in a medium of at least one solvent selected from N-methyl-2-pyrrolidone containing calcium chloride in an amount of 1.5% or more but less than 5% based on the weight of the N-methyl-2-pyrrolidone, and dimethylacetamide, N-methylcaprolactam and tetramethylurea respectively containing 1.5 to 8% based on the weight of the respective solvent mentioned above to form a polymer having a logarithmic viscosity of at least 4.3 as measured as a 0.5 g/dl solution in 98.5% by weight sulfuric acid at 30° C. and isolating the resultant polymer from the polymerization mixture.

The radicals $Ar_1$, $Ar_2$ and $Ar_3$ may be selected, independently from each other, from divalent aromatic or heteroaromatic radicals, for example, 1,4-phenylene(p-phenylene), that is ;

4,4-biphenylene, that is ;

2,6-naphthylene, that is 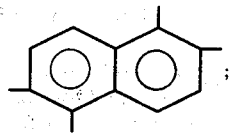;

1,5-naphthylene, that is 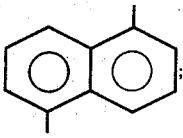;

1,4-naphthylene, that is 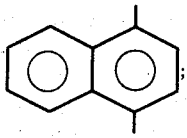;

2,5-pyridylene, that is 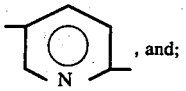, and;

2,6-quinolylene, that is .

The above-mentioned radicals have two bonds extending from the radical essentially coaxially or in parallel to each other. In the above-mentioned radical, the hydrogen atoms in the aromatic rings may be substituted by substituents which are not capable of reacting with any carboxylic acid halide compounds. Such types of substituents may be selected from halogen atoms and lower alkyls preferably having 1 to 4 carbon atoms, phenyl, carboalkoxyl, alkoxyl, acyloxy, nitro, dialkylamino, thioalkyl, carboxyl and sulfonic acid radicals.

The $Ar_1$, $Ar_2$ and $Ar_3$ radicals may be independently selected from the divalent heteroaromatic and heterocyclic radicals each having two bonds extending from the radical with a maximum spacing from each other, for example, radicals of the following formulae:

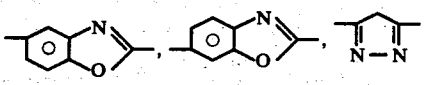

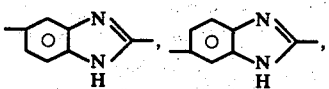

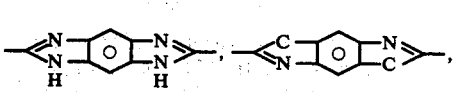

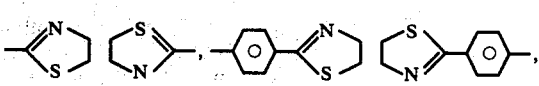

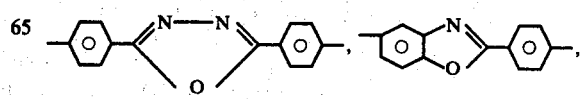

The typical types of the aromatic diamines are p-phenylene diamine, methyl-p-phenylenediamine, dimethyl-p-phenylene diamine, chloro-p-phenylenediamine, methoxy-p-phenylenediamine, nitro-p-phenylenediamine, 1,5-naphthylenediamine, 1,4-naphthylenediamine, 2,6-naphthylenediamine, 0-tolydine, 0-dianisidine, 4,4'-diaminobiphenyl, 4,4'-diaminobenzanilide, 4,4'-diaminostilbene and 2,5-pyridylenediame. The amino radical of the aromatic diamine compounds usable for the present invention may be in the form of a carbonyl-hydrazide group,

in the form a hydrazine group, —NHNH$_2$. Such types of compounds can be utilized as a component monomer of the aromatic polyamide.

The above-mentioned aromatic diamine compounds can be utilized alone or in a mixture of two or more thereof.

In the formulae (2) and (3), X may be a chlorine or bromine atom.

The aromatic dicarboxylic acid dihalides of the formula (2) may be selected from terephthalic acid dichloride, terephthalic acid dibromide, chloroterephthalic acid dichloride, 2,5-dichloro-terephthalic acid dichloride, trichloroterephthalic acid dicloride, tetrachloroterephthalic acid dichloride, methylterephthalic acid dichloride, 1,4-naphthalenedicarboxylic acid dichloride, 1,5-naphthalene dicarboxylic acid dichloride, 2,6-naphthalenedicarboxylic acid dichloride, 4,4'-biphenyl-dicarboxylic acid dichloride and isocinchomeronic acid dichloride.

The hydrogen halide salts of the aromatic amino carboxylic acid halide of the formula (3) may be selected from hydrogen chloride salt of p-aminobenzoyl chloride and hydrogen chloride salt of 1-aminonaphthalene-5-carboxylic acid chloride.

The hydrogen halide salts of the aromatic amino carboxylic acid halide of the formula (3) can be used as a comonomer to be condensed with the compounds of the formulae (1) and (2) or may be condensated alone by itself, to form the aromatic polyamide in accordance with the process of the present invention.

In the process of the present invention, the condensation polymerization process is carried out in a medium of at least one solvent selected from N-methyl-2-pyrrolidone containing calcium chloride in an amount of 1.5% or more but less than 5%, preferably from 2 to 4% based on the weight of the N-methyl-2-pyrrolidone, and dimethylacetamide, N-methylcaprolactam and tetramethylurea respectively containing from 1.5 to 8.0%, preferably from 1.5 to 5%, more preferably, from 2 to 4%, based on the weight of the respective solvent compound.

The above-mentioned solvents may be used in the state of a simple solution or in the state of a solution mixture of two or more solvents. The polymerization medium can contain as a diluent of the above-mentioned solvents, an inert liquid material which is nonreactive to the polymerization mixture, for example, methylethyl ketone, cyclohexanone, tetrahydrofuran, benzene, heptane, dimethylsulfoxide, tetramethylsulfon and a mixture of two or more of the above-mentioned compounds, in an amount of 20% or less based on the weight of the solvent.

However, it is required that the polymerization medium does not contain more than several thausands ppm of water, primary or secondary amines, or isocyanate compounds which are reactive to the polymerization mixture and which can function as stopping agents for the polymerization reaction in the process of the present invention.

In the case of the N-methyl-2-pyrrolidone, the content of calcium chloride exceeding 5% has the same effect in the polymerization reaction as that of 1.5% or more but less than 5%. Accordingly, if the content of calcium chloride is more than 5%, an economic disadvantage will result. Further, if the content of calcium chloride is increased to more than 5%, an undesirable effect on the polymerization reaction may result due to the increase in the content of undesirable impurities in the calcium chloride in the polymerization mixture.

Also, in the cases of the dimethylacetamide, N-methylcaprolactam and tetramethylurea, an increase in the content of calcium chloride to more than 8% will have no merit in the polymerization reaction and will result in an economic disadvantage. Further, a large content of more than 8% of calcium chloride sometimes causes an undesirable effect on the polymerization reaction due to the large amount of impurities in the calcium chloride.

If the content of the calcium chloride in the solvent is less than 1.5%, only a small degree of polymerization of the resultant polymer will occur.

A portion of calcium chloride to be used may be added to the solvent compound, either at the stage at which the aromatic dicarboxylic acid dihalide is added to the polymerization mixture or after the start of the polymerization process.

In order to avoid an undesirable contamination of water in the polymerization mixture, it is preferable that a dehydrated calcium chloride be used or that the mixture be dehydrated by means of azeotropic distillation or by means of the utilization of Molecular Sieves after the calcium chloride is mixed with the solvent compound.

In the polymerization mixture, it is preferable that the total content of the component monomers be regulated to such an extent that the content of the resultant polymer becomes about 4 to about 15% by weight of the polymerization mixture. An extremely small content of the monomers results in an extremely small yield of the resultant polymer. Also, an excessively large content of the monomers will cause the polymerization mixture to have an excessively large viscosity, thus, obstructing the progress of polymerization, and thereby restricting the degree of increase in the degree of polymerization of the resultant polymer. A large viscosity of the polymerization mixture will also result in a poor reproducibility of the polymer having the desired high degree of polymerization.

The polymerization temperature for the process of the present invention is not limited to any specific range. However, it is preferable that the polymerization be effected within a temperature range of from −25° to 100° C., more preferably, from −15° to 60° C. Especially, it is preferable that the polymerization reaction be started within a temperature range of from 10° to 100° C., more preferably, from 20° to 60° C.

After starting the polymerization reaction, the polymerization mixture is frequently converted into a state of slurry, paste, powder or agar, due to the rapid increase of viscosity of the mixture. Accordingly, in order to allow the resultant polymer to increase in the degree of the polymerization it is necessary to provide the polymerization apparatus with an agitating or kneading device having a sufficiently high power for continuously agitating or kneading the high viscosity liquid. For this purpose, for example, the polymerization mixture is kneaded and extruded by means of a single or twin-screw extruder and, then, further kneaded by means of a batch type or continuous type of kneader mixer, screw type continuous reactor, reciprocating rotation reactor, Votator, Pag mill, gear compounder, Ko-kneader, or a Henshel-mixer.

After stopping the polymerization reaction by adding a nonsolvent, for example, water, to the polymerization mixture, the resultant polymer may be isolated from the polymerization mixture by being washing with water or acetone.

The polymerization reaction produces a hydrogen halide as a by-product. The by-product can be neutralized by adding an alkaline compound of an element belonging to the I group or the II group of the Periodic Table, for example, CaO, Ca(OH)$_2$, or CaCO$_3$ in order to produce a useful composition of the resultant polymer. Some of the thus obtained compositions can form an optical anisotropic solution. In turn, the solution can be used to form useful specially shaped articles by utilizing the optical anisotropic property of the solution of the composition.

The resultant polymer from the process of the present invention can be shaped into fibers, filaments, fibrids, films and other articles by utilizing a combination of two processes, that is, a shaping process in which a melt or a solution of the polymer is extruded into a dry or wet atmosphere for forming the polymer into a desired shape, and a solidifying process in which the shaped melt or solution is solidified by way of cooling, coagulating or drying.

The polymerization process of the present invention can be completed in a single step in which the component monomers are mixed according to a mixing ratio (by mole) equivalent to the desired ratio by mole of the component monomers in the resultant polymer, and polymerized with each other. However, in the case where the polymerization reaction causes a rapid change in the phase of the polymerization mixture, it is preferable that the polymerization process be carried out in two or more steps. In the first step of the polymerization process, the component monomers are mixed according to a predetermined mixing ratio and prepolymerized in the medium of a solvent to prepare a prepolymer solution. Thereafter, the prepolymer solution is mixed with one of the component monomers in such an amount that the total mixing ratio of the aromatic diamine component monomer to the aromatic dicarboxylic dihalide component monomer becomes substantially 1:1, and the mixture is subjected to the condensation polymerization. The above-described polymerization process is especially preferable for the preparation of the poly-p-phenylene terephthalamide type polymer.

In the prepolymerization step, it is preferable that two types of prepolymers A and B be prepared. That is, the prepolymer A is prepared from the aromatic diamine compound and the aromatic dicarboxylic acid dihalides in a ratio by mole of 1:0.10 to 0.98, preferably, 1:0.40 to 0.95, and the other prepolymer B is prepared from the above-mentioned monomers in a ratio by mole of 1:1.02 to 10.0, preferably, 1:1.05 to 3.50. That is, in the preparation of the prepolymer A, an excess amount by mole of the aromatic diamine component monomer is used, and in the case of the prepolymer B, an excess amount by mole of the aromatic dicarboxylic acid dihalide is used.

In both the prepolymerization steps for the prepolymers A and B, a predetermined amount of the aromatic diamine component monomer may be dissolved in the solvent. Then, the aromatic dicarboxylic acid dihalide component monomer in the form of powder, melt or solution is added to the diamine monomer solution. Otherwise, the aromatic dicarboxylic acid dihalide component monomer and the aromatic diamine component monomer, which are in the state of powder, melt or solution, are mixed together. Thereafter, a solvent is added to the above-prepared mixture. Unless the prepolymers are moistened, mixed with a large amount of a nonsolvent liquid or heated to a high temperature, the prepolymers A and B will be obtained in the state of solution having a relatively high fluidity with a surprisingly high stability. Accordingly, the above-mentioned types of prepolymers are effective for preventing the gelatinizing of the polymerization mixture.

When the ratio by mole of the aromatic dicarboxylic acid dihalide to the aromatic diamine is less than 0.10 in the prepolymer A or more than 10.0 in the prepolymer B, the resultant prepolymer A or B will not be suitable for the process of the present invention. That is, the use of the above-mentioned type of prepolymer A or B will cause an unstable condition to occur during the condensation polymerization. That is, the resultant final polymer will have a relatively small degree of polymerization or will have a nonuniform degree of polymerization.

In the case where the aromatic dicarboxylic acid dihalide is employed in a ratio by mole of more than 0.98 in the prepolymer A or less than 1.02 in the prepolymer B, the resultant prepolymer A or B will have very poor fluidity and sometimes cannot be kept in the state of a fluidal solution. Even if the prepolymer solution A or B is in a fluidal state right after the completion of the prepolymerization, the solution will generally tend to gelatinize immediately. Accordingly, the above-mentioned types of prepolymers are poor in stability, fluidity and in the storing property thereof.

The prepolymerization reaction for each prepolymer can be effected in two or more steps. That is, in the preparation of the prepolymer, the aromatic dicarboxylic acid dihalide may be added to the aromatic diamine solutions either continuously dropwise or periodically in two or more times. For example, in the case where the aromatic dicarboxylic acid dihalide component monomer in an amount of 0.75 mole is to be mixed to 1 mole of the aromatic diamine component monomer, the former component monomer may be intermittently mixed to the latter component monomer in two stages each in an amount of 0.375 mole or in three stages each in an amount of 0.25 mole. In this connection, it should be noted that the distribution in the degree of polymerization of the resultant prepolymers (oligomers) varies depending on the manner of mixing the component monomers with each other. Also, it should be noted that the distribution in the degree of polymerization of the prepolymers varies in accordance with the length of time during which the component monomers are continuously mixed with each other and in accordance with the time for intermittently mixing the component monomers.

Further, even if the number of the mixing operations of the component monomers in a prepolymerization step is the same as that in another prepolymerization step, a difference in the mixing ratios of the component monomers between the polymerization steps will cause a difference in the distributions in the degree of polymerization between the resultant prepolymers.

For example, the distribution in the degrees of the polymerization of prepolymers which had been prepared by mixing, firstly, 0.25 mole and, then, 0.5 mole of the aromatic dicarboxylic acid dihalide component monomer to 1 mole of the aromatic diamine component monomer is different from that of other prepolymers which had been prepared by mixing, firstly, 0.5 mole and, then, 0.25 mole of the aromatic dicarboxylic acid dihalide component monomer.

In the prepolymer A mentioned above, more than 50% by number of the terminal groups thereof consist of the carboxylic acid halide groups. However, more than 50% of the total number of the terminal groups of the prepolymer B consist of the amine groups.

Generally, the compounds in which more than 50% of the total number of the terminal groups thereof consist of the carboxylic acid halide groups are unstable due to the high reactivity of the carboxylic acid halide groups. Therefore, if the prepolymer solution contains some impurities, for example, water, the carboxylic acid halide groups will be decomposed by way of, for example, hydrolysis. Such decomposition will result in a reduction or loss of the reactivity of the prepolymers. Furthermore, it was reported by H. Herlinger in "Applied Polymer Symposia," No. 21, page 201 (1972), published by John Wiley and Sons, that a portion of the carboxylic acid halide groups reacts with a portion of the solvent compound at a very small reaction rate and reduces or loses the condensation reactivity thereof. Accordingly, it is desirable that the solution of the prepolymer B be dehydrated and stored at a low temperature or used as soon as the preparation thereof has been completed.

There is a tendency that the product of the present invention, prepared by using the prepolymer B in which more than 50% of the total number of the terminals of the prepolymer B were occupied by the carboxylic acid halide groups, generally contains a larger amount of polymer fraction having a relatively small degree of polymerization than another product produced by using the prepolymer A having a content by number of the carboxylic acid halide groups located at the terminals of the prepolymer A being less than 50%. Accordingly, it will be difficult to process the former product during the shaping process, for example, the spinning process, and during the solidifying process, for example, the coagulating process, due to the presence of the polymer fraction which has a low degree of polymerization. Therefore, the most preferable prepolymer is the type of prepolymer A in which most of the terminals of the prepolymer A are occupied by the amino groups.

The prepolymerization step is preferably carried out in an inert atmosphere, for example, in a nitrogen, argon, or carbon dioxide gas atmosphere. Also, it is preferable that the inert atmosphere contains no moisture or a very small amount of moisture.

Although the prepolymerization temperature is not limited to any specific range, it is preferable that the prepolymerization step be effected at a temperature within a range of from $-20°$ to $100°$ C., more preferably from $-10°$ to $60°$ C.

Also, the total concentration of the component monomers in the prepolymerization mixture is not at all limited to a specific range. However, it is preferable that the total concentration be within a range of from 0.1 to 3 moles/liter. Because the resultant prepolymers are very stable, the period of time required for prepolymerization can be determined at will. In a some case, the prepolymerization mixture may be subjected to the condensation polymerization process at a stage at which the prepolymerization reaction has not yet been completed.

Generally, after the completion of the prepolymerization process, the prepolymerization mixture can be stored for a considerable period of time after it has been applied with a treatment for protecting the product against moisture. Otherwise, the prepolymerization mixture, which is still in the state of a fluidal liquid, may be directly forwarded to a subsequent condensation polymerization process through a storage tank or a measuring pump.

In the condenzation polymerization process, one or more types of prepolymers and, if necessary, one or more types of component monomers are mixed together so that the ratio by mole of the amino groups to the carboxylic acid halide groups in the resultant polymer will be about 1:1. An additional amount of the component monomers to be added into the condensation polymerization process may be in the form of powder, melt, solution or dispersion. The additional amount of the component monomers may be dissolved or suspended in the afore-specified solvent or in an inert solvent for the polymerization process, for example, benzene, cyclohexane, heptane, methylethyl ketone, tetrahydrofuran, hydrohexanone, cyclohexanone or tetramethyl sulfon. The condensation polymerization is preferably performed at a temperature of from $0°$ to $100°$ C., more preferably, from $20°$ to $100°$ C., most preferably, from $30°$ to $90°$ C.

During the condensation polymerization process, viscosity of the polymerization mixture is rapidly increased. Furthermore, the polymerization mixture originally in the state of a solution, is converted into a slurry, paste, gel or powder. Accordingly, in the case where a polyamide having a high degree of polymerization is to be prepared, the polymerization apparatus to be used should be provided with an agitating or kneading device having high power and high efficiency. The agitating or kneading device should be effective not only for promoting the progress of the polymerization reaction but also for reducing the viscosity of the polymerization mixture to an extremely low degree.

The agitating or kneading operation is preferably performed in accordance with the following manner of the present invention.

The agitating or kneading operation for the polymerization mixture is carried out by forcibly rotating one or more kneading surfaces immersed in the polymerization mixture around an axis of a rotating shaft.

In order to regulate the viscosity of the polymerization mixture during the condensation polymerization process, the following method may be applied to the process of the present invention. That is, at least after the viscosity of the polymerization mixture as measured by a falling-ball viscometer has exceeded 1000 poises the polymerization mixture is kneaded for five minutes or more under such a condition that the kneading operation for a period of 5 minutes produces a Mohr's pattern with a width of 200μ or less. Meanwhile, a shear stress of at least 1 g/cm² is applied to the polymerization mixture, and the polymerization mixture is thereby gelatinized.

In the measurement of the viscosity of the polymerization mixture by using a falling-ball viscometer, the kneading operation for the polymerization mixture is occasionally stopped, and a stainless steel ball having a diameter of 6.0 mm and a specific gravity of 7.9 is allowed to fall into the polymerization mixture. In the case where the ball can fall through a distance of 2.5 cm of the polymerization mixture in a period of 19 seconds at a constant velocity, the viscosity of the polymerization mixture is indicated as 1000 poises. Provided that the ball can fall through a distance of 2.5 cm in t seconds, the viscosity V of the polymerization mixture can be calculated in accordance with the following equation.

$$V = 1000 \times t/19 \text{ poises}$$

It is preferable that the above-mentioned method for regulating the viscosity of the polymerization mixture be applied before or just after the viscosity of the polymerization mixture has exceeded 1000 poises. If the viscosity regulating method is applied to a polymerization mixture having a viscosity much greater than 1,000 poises, for example, 10,000 poises, it will be difficult to perform the polymerization process smoothly and the resultant product will contain a considerable amount of a polymer fraction having a degree of polymerization lower than that desired.

It is known that the mixture will generally have a yield stress of 1 g/cm² or more when the viscosity of the polymerization mixture exceeds 1000 poises. In order to maintain the polymerization mixture in the state of a fluidal liquid, it is necessary to agitate or knead the polymerization mixture while applying a shear stress of at least 1 g/cm² to the polymerization mixture. The kneading operation under the above-mentioned condition should be effected for at least five minutes. The value of the shear stress can be calculated from the following equation:

$$\bar{\sigma} = \frac{T}{\int r \cos\theta \cdot dA}$$

wherein $\bar{\sigma}$ represents an average shear stress applied onto an outermost periphery of the space in which the polymerization is carried out; T represents a torque applied to the rotating shaft of the kneading device which may be measured by using a conventional spring type torque meter; dA represents a surface element; r represents a distance between the rotating shaft and the outermost periphery of the polymerization space; and $\theta$ represents an angle formed between a normal line and a line along which the r is measured. The outermost peripheral surface of the polymerization space is defined by an inside wall surface of the polymerization vessel. In the above-indicated equation, the integral calculation is effected over the entire area of the outermost periphery of the polymerization space.

The width m of the Mohr's pattern formed in the polymerization mixture can be defined by the following equation:

$$m = L/(n+1)$$

wherein n represents the total number of rotations of the kneading surface during a period of 5 minutes of the kneading operation, and L represents the greatest distance between the outermost peripheral surface of the polymerization space and a kneading space. The distance mentioned above is determined in the following manner. When imaginary lines are perpendicularly drawn from an axis of a rotating shaft of the kneading device toward the outermost peripheral surface of the polymerization space through the kneading surface, to intersect the peripheral surface at points A and to intersect the kneading surface at points B, the distances between the peripheral surface and the kneading surface along the lines will then be indicated by the symbol $\overline{AB}$. In such a case, L represents the greatest distances $\overline{AB}$. In the case where two or more kneading surfaces rotate at different rotating velocities from each other, n will represent the smallest total number of rotations of a kneading surface during a period of 5 minutes of the kneading operation.

It is apparent that the parameter m expresses the average width of the whirlpool patterns formed in the polymerization mixture 5 minutes after the start of the kneading operation. The whirlpool patterns or Mohr's patterns are explained in Chapter 3, "Mixing and Dispersing" by W. D. Mohr found in F. C. Bernhardt's Processing of Thermoplastic Materials, published by Reinfold publishing Co., (1959).

It is known that in the case of a Newtonian liquid the smaller the width of the Mohr's patterns formed in the liquid by a kneading operation, the higher the kneading efficiency.

It was discovered by the inventors of the present invention that the kneading operation, wherein the polymerization mixture (after exceeding a viscosity of 1000 poises as measured by a falling-ball viscometer) is kneaded for 5 minutes or more to produce the Mohr's patterns with a width of 200μ or less while a shear stress of at least 1 g/cm² is applied to the polymerization mixture, has a high efficiency for kneading a viscoelastic material and is effective for promoting the polymerization reaction of the process of the present invention.

The above-mentioned mode of kneading operation may be carried out concurrently with another mode of kneading operation, for example, reciprocal motion type of kneading operation.

With a lapse of time during the polymerization process, the degree of polymerization of the resultant polymers is increased and the polymerization mixture is thereby gelatinized. During the process, lyotropic liquid crystals of the polymers, especially those of the poly-p-phenylene terephthalamide type polymers are sometimes formed in the polymerization mixture.

In order to enhance the solubility of the component monomers or the resultant polymers in the polymerization medium or to regulate the polymerization rate, it is effective to add a tertiary amine compound, inorganic hydroxide compounds (for example, lithium hydroxide) or an inorganic salt (for example, lithium chloride) into the solvent.

Especially, the tertiary amine compounds such as cyclic tertiary amines for example, pyridine, α, β, and γ-picoline, quinoline, isoquinoline, N-methyl carbazole, dimethyl aniline and diethyl aniline, are preferable for the above-mentioned purpose. However, the most preferable amine compound for this purpose is pyridine. The above-mentioned additive can be added in the state of gas, solution or powder to the polymerization medium at one time or periodically in two or more times before, during or after the start of the polymerization process. The amine compound can be used in the form of a hydrochloric acid salt thereof. Generally, the above-mentioned additive is used in an amount of 20% or less based on the weight of the afore-specified solvent, and is effective for increasing the degree of polymerization of the resultant polymers, especially, the poly-p-phynylene terephthalamide type polymers, in a relatively high concentration of polymers in the polymerization medium.

The polymers produced in accordance with the process of the present invention can be utilized for a wide scope of purposes, for example, clothings and industrial materials. As further examples, the polymers can be used to produce heat-resistant fabrics, hoses, films, sheets and adhesives; flame-resistant curtains, wallpapers and carpets; bag-filters; rubber-reinforcing materials for tires, belts and air bags, and resin-reinforcing materials for shaped synthetic resin articles.

The present invention will be further illustrated by the following examples which are presented as illustrations and not as limitations of the scope of the present invention. In the examples below, all parts and percentages are expressed by weight unless otherwise stated.

Also, in the examples, the logarithmic viscosity (η inh) was determined in accordance with the following method.

A polymer to be tested was dissolved in a concentration of 0.5 g/dl in a 98.5% (by weight) sulfuric acid. The relative viscosity of the polymer was measured at 30° C., and the logarithmic viscosity of the polymer was determined in accordance with the following equation:

$$\eta\ inh = (\ln \eta\ rel)/C$$

wherein η rel is the relative viscosity of the polymer and C is the concentration in g/dl of the polymer in the sulfuric acid.

EXAMPLES 1 through 6

A separable flask, having a capacity of 300 ml and being provided with a high speed stirrer, a path for feeding and discharging nitrogen gas and a path for charging component monomers and a solvent, was completely dried by externally heating it while flowing nitrogen gas through the flask.

N-methyl-2-pyrrolidone was mixed with 4% of calcium chloride based on the weight of the N-methyl-2-pyrrolidone, and the resultant solvent was dried by means of Molecular Sieves.

In Example 1, 1.622 g of p-phenylene diamine were dissolved in 35 ml of the above-prepared N-methyl-3-pyrrolidone solution at a room temperature and the solution was cooled to a temperature of 0° C. 1.500 g of terephthalic acid dihalide were added to the cooled solution and the resultant mixture was subjected to a prepolymerization process in a temperature range of from 5° to 15° C. for 10 minutes. A uniform clear solution of the resultant prepolymer was obtained.

Next, 1.552 g of terephthalic acid dichloride were added to the prepolymer solution so that the mixing ratio by mole of the p-phenylene diamine component monomer to the terephthalic acid dichloride component monomer be about 1:1. The mixture was next subjected to a condensation polymerization process in a temperature range of from 20° to 30° C. while the mixture was being stirred. When the viscosity of the polymerization mixture reached between 500 to 1000 poises, the polymerization mixture was moved from the flask into a kneader having a pair of biaxial kneading screws. The mixture was kneaded in the kneader for 10 minutes while a shear stress of about 3 g/cm² was applied thereto. During the kneading process, the kneading screws were rotated a rate of 50 rotations/minute. Five minutes after the start of the kneading operation, the polymerization mixture exhibited Mohr's patterns having a width of 48μ.

After completion of the polymerization process, the polymerization mixture was kept for 80 minutes without agitation, and 300 ml of water were added to the polymerization mixture so as to allow the resultant polymer to separate and precipitate from the polymerization mixture. The thus obtained precipitation (polymer) was filtered, washed with water and dried. Poly-p-phenylene terephthalamide in the form of powder were obtained at a percentage yield of 99.5%.

A portion of the resultant polymer was subjected to the measurement of logarithmic viscosity. The result of Example 1 is shown in Table 1.

In Example 2, the same procedures as those described in Example 1 were repeated, except that the kneading operation was carried out for 30 minutes, and the polymerization mixture was kept for 60 minutes without agitation after completion of the polymerization process. The logarithmic viscosity of the resultant polymer of Example 2 is shown in Table 1.

In Example 3, procedures identical to those in Example 1 were carried out, except that the kneading operation was continued for 60 minutes. Thereafter, the polymerization mixture was kept for 30 minutes without agitation. The logarithmic viscosity of the resultant polymer of Example 3 is shown in Table 1.

In Example 4, the same procedures as those described in Example 1 were carried out, except that the kneading operation was carried out for a brief period of 3 minutes. Thereafter, the polymerization mixture was maintained for 87 minutes without agitation.

In Example 5, the same procedures as those described in Example 1 were repeated, except that the kneading operation was carried out at a low rotating rate of 2 rotations/minute of the kneading screws for 10 minutes. The width of the Mohr's patterns was 1090μ.

In Example 6, the same procedures as those described in Example 1 were effected, except that the kneading operation was conducted for 5 minutes under the condition wherein a shear stress of 0.5 g/cm$^2$ was applied to the polymerization mixture. After completion of the kneading operation, the polymerization mixture was maintained for 85 minutes without agitation. After the start of the kneading operation, the rotating rate of the kneading screws is rapidly decreased until the screws have stopped rotating.

The logarithmic viscosities of the resultant polymers of Examples 4 through 6 are shown in Table 1.

Table 1

| Example No. | ζ inh |
|---|---|
| 1 | 5.1 |
| 2 | 5.8 |
| 3 | 6.5 |
| 4 | 4.3 |
| 5 | 4.4 |
| 6 | 4.4 |

EXAMPLES 7 and 8

In Example 7, the same procedures as those described in Example 3 were conducted, except that 1.074 g of p-phenylene diamine were dissolved in 53 ml of N-methyl-2-pyrrolidone containing 2.3% by weight of calcium chloride, 2.022 g of terephthalic acid dichloride were added at one time to the above-prepared solution of the p-phenylene diamine, and the resultant polymerization mixture was immediately subjected to the kneading operation.

In Example 8, the same procedures as those described in Example 7 were carried out, except that the p-phenylene diamine, the N-methyl-2-pyrrolidone containing 2.3% by weight of calcium dichloride and terephthalic acid dichloride were respectively used in amounts of 1.083 g, 45 ml and 2.041 g.

The logarithmic viscosities of the resultant polymers of Examples 7 and 8 are shown in Table 2.

Table 2

| Example No. | ζ inh |
|---|---|
| 7 | 5.3 |
| 8 | 5.0 |

Comparison Examples 1 and 2

In Comparison Example 1, procedures identical to those in Example 7 were repeated, except that 2.163 g of p-phenylene diamine were dissolved in 71 ml of N-methyl-2-pyrrolidone containing a small amount (1% by weight) of calcium chloride, and 4.073 g of terephthalic acid dichloride were added to the p-phenylene diamine solution.

In Comparison Example 2, procedures identical to those in Comparison Example 1 were conducted, except that 3.244 g of p-phenylene diamine were dissolved in 78 ml of N-methyl-2-pyrrolidone containing 1% by weight of calcium chloride, and terephthalic acid dichloride was used in an amount of 6.109 g.

The resultant logarithmic viscosities of Comparison Examples 1 and 2 are shown in Table 3.

Table 3

| Comparison Example No. | ζ inh |
|---|---|
| 1 | 2.5 |
| 2 | 2.0 |

EXAMPLE 9

The same procedures as those described in Example 3 were performed, except that 35 ml of dimethyl acetamide containing 3% by weight of calcium chloride were employed in place of the N-methyl-2-pyrrolidone solution. The resultant polymer had a logarithmic viscosity of 5.8.

EXAMPLES 10 THROUGH 13

In each of the Examples 10 through 13, the same procedures as those described in Example 1 were conducted, except that the p-phenylene diamine, the N-methyl-2-pyrrolidone solution containing 4% by weight of calcium chloride and the terephthalic acid dichloride were employed in amounts indicated in Table 4.

The results of Examples 10 through 13 are also shown in Table 4.

Table 4

| Example No. | PPDA (g) | NMP containing 4 wt. % CaCl$_2$ (ml) | TPC (g) | ζ inh |
|---|---|---|---|---|
| 10 | 1.081 | 55 | 2.036 | 5.5 |
| 11 | 1.088 | 35 | 2.049 | 5.5 |
| 12 | 1.628 | 35 | 3.067 | 6.5 |
| 13 | 2.165 | 40 | 4.077 | 5.2 |

(Note)
PPDA : p-phenylene diamine
NMP : N-methyl-2-pyrrolidone
TPC : terephthalic acid dichloride

Comparison Examples 3, 4 and 5

In each of the Comparison Examples 3, 4 and 5, procedures identical to those described in Example 1 were conducted, except that the p-phenylene diamine and the terephthalic acid dichloride were employed in amounts shown in Table 5, and N-methyl-2-pyrrolidone containing no calcium chloride was used in an amount shown in Table 5. In each polymerization process of Comparison Examples 3, 4 and 5, the addition of terephthalic acid dichloride into the p-phenylene diamine solution immediately resulted in the formation of a muddy yellow polymerization mixture. The results of Comparison Examples 3, 4 and 5 are shown in Table 5.

Table 5

| Comparison Example No. | PPDA (g) | NMP (ml) | TPC (g) | ζ inh |
|---|---|---|---|---|
| 3 | 1.081 | 180 | 2.036 | 1.0 |
| 4 | 1.081 | 113 | 2.036 | 0.7 |
| 5 | 2.163 | 71 | 4.073 | 0.6 |

EXAMPLES 14 AND 15

In each of Examples 14 and 15, the same procedures as those described in Example 1 were carried out, except that the p-phenylene diamine and terephthalic acid dichloride were used in amounts indicated in Table 6, and N-methyl-2-pyrrolidone containing 2.3% by weight of calcium chloride was used in amounts shown in Table 6. The results of Examples 14 and 15 are shown in Table 6.

Table 6

| Example No. | PPDA (g) | NMP containing 2.3 wt. % CaCl$_2$ (ml) | TPC (g) | $\zeta$ inh |
|---|---|---|---|---|
| 14 | 1.074 | 53 | 2.022 | 5.3 |
| 15 | 1.083 | 45 | 2.041 | 5.0 |

Comparison Examples 6 and 7

In each of the Comparison Examples 6 and 7, the same procedures as those described in Example 1 were carried out, except that the p-phenylene diamine and the terephthalic acid dichloride were used in amounts indicated in Table 7, and N-methyl-2-phrrolidone containing a small amount 1% by weight of calcium hloride was employed in an amount shown in Table 7. Table 7 also shows the results of Comparison Examples 6 and 7.

Table 7

| Comparison Example No. | PPDA (g) | NMP containing 1 wt. % CaCl$_2$ (ml) | TPC (g) | $\zeta$ inh |
|---|---|---|---|---|
| 6 | 2.163 | 71 | 4.073 | 1.3 |
| 7 | 3.244 | 78 | 6.109 | 1.0 |

EXAMPLES 16 AND 17

In Example 16, the same procedures as those described in Example 11 were carried out, except that no kneader was used, and the polymerization was completed in the flask.

In Example 17, the same procedures as those used in Example 13 were repeated, except that no kneader was used, and the polymerization was completed in the flask.

The results of Examples 16 and 17 are shown in Table 8.

Table 8

| Example No. | $\zeta$ inh |
|---|---|
| 16 | 4.3 |
| 17 | 4.7 |

Comparison Examples 8 and 9

In each of the Comparison Examples 8 and 9, the same procedures as those employed in Comparison Example 6, were used, except that the p-phenylene diamine, the N-methyl-2-pyrrolidone containing 1% by weight of calcium chloride and terephthalic acid dichloride were respectively used in amounts shown in Table 9. In addition, no kneader was used and the polymerization was completed in the flask. The results of Comparison Examples 8 and 9 are indicated in Table 9.

Table 9

| Comparison Example No. | PPDA (g) | NMP containing 1 wt. % CaCl$_2$ (ml) | TPC (g) | $\zeta$ inh |
|---|---|---|---|---|
| 8 | 1.081 | 55 | 2.036 | 1.2 |
| 9 | 2.163 | 71 | 4.073 | 0.9 |

EXAMPLE 18

The same procedures as those described in Example 11 were carried out, except that 35 ml of dimethyl acetamide containing 3% by weight of calcium chloride were used. The resultant polymer had a logarithmic viscosity of 5.1.

EXAMPLE 19

Procedures identical to those shown in Example 15 were carried out, except that while the polymerization mixture was being moved from the flask to the kneader, 1.0 g of dehydrated calcium chloride was admixed to the polymerization mixture and, then, the admixture was kneaded by the kneader. The resultant polymer had a logarithmic viscosity of 5.2 which is larger than that of Example 16.

EXAMPLES 20, 21 AND 22

In each of the Examples 20, 21 and 22, the same procedures as those described in Example 10 were performed except that the p-phenylene diamine and the N-methyl-2-pyrrolidone containing 4% by weight of calcium chloride were used in amounts shown in Table 10, and a mixture of terephthalic acid dichloride and 4,4'-biphenyl dicarboxylic acid dichloride in amounts respectively shown in Table 10 were used in place of the sole terephthalic acid dichloride. The results are also shown in Table 10.

Table 10

| Example No. | PPDA (g) | NMP containing 4 wt. % CaCl$_2$ (ml) | Dicarboxylic acid halide (g) | | $\zeta$ inh |
|---|---|---|---|---|---|
| | | | TPC | ClOC—⌬—⌬—COCl | |
| 20 | 1.6238 | 60 | 1.2236 | 2.5243 | 5.4 |
| 21 | 1.6220 | 55 | 1.2216 | 2.5190 | 5.6 |
| 22 | 1.6220 | 50 | 1.2220 | 2.5148 | 6.3 |

Comparison Examples 10, 11 and 12

In Comparison Example 10, the same procedures as those described in Comparison Example 5 were repeated, except that 71 ml of dimethylacetamide were used instead of N-methyl-2-pyrrolidone.

In Comparison Example 11, the same procedures as those described in Comparison Example 5 were repeated, except that 71 ml of N-methylcaprolactam were used in place of N-methyl-2-pyrrolidone, and the component monomers were respectively used in amounts shown in Table 11.

In Comparison Example 12, the same procedures as those described in Comparison Example 5 were repeated, except that 71 ml of tetramethylurea were used in place of N-methyl-2-pyrrolidone, and the component monomers were employed in amounts shown in Table 11.

employed in amounts indicated in Table 12. The results of Examples 25, 26 and 27 are also shown in Table 12.

Table 12

| Example No. | PPDA (g) | NMP containing 4 wt. % CaCl$_2$ (ml) | Dicarboxylic acid dihalide (g) | | $\zeta$ inh |
|---|---|---|---|---|---|
| | | | TPC | 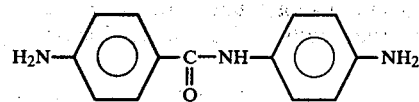 | |
| 25 | 1.622 | 50 | 2.436 | 0.759 | 5.5 |
| 26 | 1.622 | 50 | 1.523 | 1.898 | 5.1 |
| 27 | 1.622 | 50 | 0 | 3.796 | 4.3 |

The results of Comparison Examples 10, 11 and 12 are shown in Table 11.

Table 11

| Comparison Example | PPDA (g) | Solvent (ml) | TPC (g) | $\zeta$ inh |
|---|---|---|---|---|
| 10 | 2.163 | DMA 71 | 4.073 | 1.2 |
| 11 | 2.163 | NCL 71 | 4.074 | 1.3 |
| 12 | 2.164 | TMU 71 | 4.074 | 0.8 |

(Note)
DMA : Dimethylacetamide
NCL : N-methylcaprolactam
TMU : Tetramethylurea

EXAMPLE 23

Procedures identical to those of Example 18 were carried out, except that calcium chloride was contained in an amount of 4% by weight in dimethylacetamide. The resultant polymer had a logarithmic viscosity of 5.3.

EXAMPLE 24

Procedures identical to those of Example 19 were effected, except that 45 ml of tetramethylurea containing 2% by weight of calcium chloride were used as a solvent, and 2 g of dehydrated calcium chloride were added to the polymerization mixture 2 minutes after terephthalic acid dichloride was added to the p-phenylene diamine solution.
The resultant polymer had a logarithmic viscosity of 4.6.

EXAMPLES 25, 26 AND 27

In each of the Examples 25, 26 and 27, the same procedures as those mentioned in Example 22 were utilized, except that 2,6-naphthalene dicarboxylic acid dichloride was used in an amount indicated in Table 12 instead of 4,4-biphenyl dicarboxylic acid dichloride, and the component monomers and the solvent were

EXAMPLES 28 AND 29

In each of the Examples 28 and 29, the same procedures as those mentioned in Example 1 were repeated, except that a portion of p-phenylene diamine was replaced by a diamine compound of the formula:

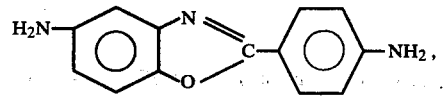

and the component monomers and the solvent were employed in amounts shown in Table 13. The results of Examples 28 and 29 are also shown in Table 13.

Table 13

| Example No. | Diamine (g) | | NMP containing 4 wt. % CaCl$_2$ (ml) | TPC (g) | $\zeta$ inh |
|---|---|---|---|---|---|
| | PPDA | H$_2$N—⟨O⟩—C(=O)—NH—⟨O⟩—NH$_2$ | | | |
| 28 | 0.919 | 0.341 | 35 | 2.036 | 5.8 |
| 29 | 0.757 | 0.682 | 35 | 2.037 | 5.5 |

EXAMPLES 30, 31 AND 32

In each of the Examples 30, 31 and 32, the same procedures as those used in Example 28 were repeated, except that 5-amino-2-(p-aminophenyl)benzoxazole of the formula:

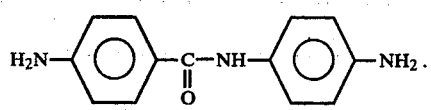

was used in place of the compound of the formula:

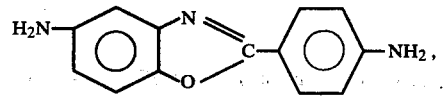

In addition, (1) N-methyl-2-pyrrolidone containing 2% by weight of calcium chloride and 2 ml of pyridine was used and (2) the component monomers and the solvent were used in amounts respectively shown in Table 14. The results of Examples 30, 31 and 32 are shwon in Table 14.

Table 14

| Example No. | Diamine (g) PPDA | Diamine (g) 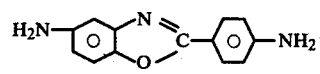 | NMP containing 2 wt. % CaCl$_2$ (ml) | TPC (g) | Pyridine (ml) | ζ inh |
|---|---|---|---|---|---|---|
| 30 | 1.460 | 0.338 | 30 | 3.055 | 2 | 6.0 |
| 31 | 1.298 | 0.676 | 30 | 3.055 | 2 | 8.8 |
| 32 | 2.596 | 1.352 | 42 | 6.111 | 2 | 5.2 |

EXAMPLE 33

The same procedures as those mentioned in Example 30 were repeated, except that no p-phenylene diamine was used. Furthermore, 2.927 g of 5-amino-2-(p-aminophenyl)benzoxazole and 2.641 g of terephthalic acid dichloride were used. In addition, 30 ml of the solvent containing 2 ml of dimethyl aniline were used in place of the pyridine. The resultant polymer had a logarithmic viscosity of 5.4.

EXAMPLE 34

The same procedures as those described in Example 33 were carried out except that a mixture of 1.298 g of p-phenylene diamine and 0.676 g of 5-amino-2-(p-aminophenyl)-benzimidazole was used as the diamine component monomer. In addition, N-methyl-2-pyrrolidone containing 2% by weight of calcium chloride and terephthalic acid dichloride were used in amounts of 30 ml and 3.056 g, respectively, while no pyridine was used. The resultant polymer had a logarithmic viscosity of 5.5.

EXAMPLE 35

The same procedures as those described in Example 1 were repeated by using 1.081 g of p-phenylene diamine, 50 ml of N-methyl-2-pyrrolidone containing 4% by weight of calcium chloride, 2 ml of pyridine, a mixture of 1.426 g of terephthalic acid dichloride and 0.840 g of 4,4′ biphenyl dicarboxylic acid dichloride. The resultant polymer had a logarithmic viscosity of 5.2.

EXAMPLE 36

The same procedures as those described in Example 1 were carried out by using 3.244 g of p-phenylene diamine, 78 ml of N-methyl-2-pyrrolidone containing 4% by weight of calcium chloride, 2 ml of pyridine and 6.109 g of terephthalic acid dichloride. The resultant polymer had a logarithmic viscosity of 5.2.

EXAMPLE 37

The same procedures as those described in Example 20 were carried out by using 1.628 g of p-phenylene diamine and 38 ml of N-methyl-2-pyrrolidone containing 4% by weight of calcium chloride. In addition, 3.067 g of terephthalic acid dichloride were used together with 0.384 g of hydrochloric acid salt of p-aminobenzoic acid chloride of the formula:

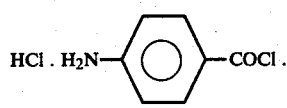

The resultant polymer had a logarithmic viscosity of 5.5.

EXAMPLE 38

The same procedures as those in described in Example 37 were conducted, except that the hydrochloric acid salt of p-aminobenzoic acid chloride was used in an amount of 0.768 g. The resultant polymer had a logarithmic viscosity of 4.8.

What we claim is:

1. A process for producing a fiber, film, fibroid or other shaped article forming aromatic polyamide having a logarithmic viscosity (ηinh/of) from about 4.3 to 8.8, comprising subjecting (A) a mixture of at least one aromatic diamine of the formula (1):

$$H_2N-Ar_1-NH_2 \qquad (1)$$

and at least one aromatic dicarboxylic acid dihalide of the formula (2):

$$XOC-Ar_2-COX \qquad (2),$$

(B) a mixture of at least one of the aromatic diamines of the formula (1), at least one of the aromatic dicarboxylic acid dihalides of the formula (2) and at least one hydrogen halide salt of aromatic amino carboxylic acid halide of the formula (3):

$$XH.H_2N-Ar_3-COX \qquad (3)$$

or (C) at least one of the hydrogen halide salts of the aromatic amino carboxylic acid halides of the formula (3), wherein $Ar_1$, $Ar_2$ and $Ar_3$ respectively represent, independently from each other, a divalent aromatic or heteroaromatic radical having two essentially coaxial or parallel, oppositely directed, chain extending bonds or a divalent heteroaromatic radical having two bonds extending from said radical with a maximum spacing from each other and X represents a halogen atom, to a condensation polymerization in a medium of at least one solvent selected from the group consisting of N-methyl-2-pyrrolidone containing calcium chloride in an amount of 1.5% or more but less than 5% based on the weight of the N-methyl-2-pyrrolidone, and dimethylacetamide, N-methylcaprolactam and tetramethylurea respectively containing calcium chloride in an amount of 1.5% to 8% based on the weight of the respective solvent compound, kneading said polymerization mixture, after the viscosity of said polymerization mixture reaches between 500 and 10,000 poises as determined by a falling-ball viscometer, until the logarithmic viscosity of the resultant polymer reaches from about 4.3 to 8.8, said logarithmic viscosity being determined by using a 5 g/dl solution of said polymer in 98.5% sulfuric acid at 30° C., and isolating the resultant polymer from the polymerization mixture.

2. A process as claimed in claim 1, wherein said $Ar_1$, $Ar_2$ and $Ar_3$ respectively represent, independently from each other, 1,4-phenylene, 4,4′-biphenylene, 1,5-naphthylene, 1,4-naphthylene 2,6-naphthylene, or

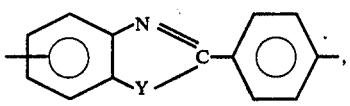

wherein Y represents —NH—, —O— or —S— radical.

3. A process as claimed in claim 1, wherein (A) a mixture of 1,4-phenylene diamine and terephthalic acid, (B) a mixture of 1,4-phenylene diamine, terephthalic acid and hydrogen chloride salt of p-aminobenzoic acid chloride, or (C) the hydrogen chloride salt of p-aminobenzoic acid chloride alone is subjected to the condensation polymerization.

4. A process as claimed in claim 1, wherein said calcium chloride is contained in an amount of 1.5 to 5% in dimethylacetamide, N-methylcaprolactam or tetramethylurea.

5. A process as claimed in claim 1, wherein said calcium chloride is contained in an amount of 2 to 4% in said N-methyl-pyrrolidone.

6. A process as claimed in claim 4, wherein said calcium chloride is contained in an amount of 2 to 4% in said dimethylacetamide, N-methylcaprolactam or tetramethylurea.

7. A process as claimed in claim 1, wherein a solubility enhancing or polymerization rate regulating amount of an aromatic or heterocyclic tertiary amine is added to the polymerization mixture.

8. A process as claimed in claim 7, wherein said aromatic tertiary amine is dimethyl aniline or diethyl aniline.

9. A process as claimed in claim 7, wherein said heterocyclic tertiary amine is pyridine.

10. A process as claimed in claim 1, wherein said polymerization mixture is kneaded for 5 minutes or more under such a condition that the kneading operation for 5 minutes results in a width of the Mohr's pattern of $200\mu$ or less while a shear stress of at least 1 g/cm$^2$ is applied to said polymerization mixture.

11. A process for producing a fiber-, film-, fibroid- or other shaped article-forming poly-p-phenylene terephthalamide having a logarithmic viscosity ($\eta$inh) from about 4.3 to 8.8, comprising the steps of:

stirring a condensation-polymerization mixture consisting of 1,4-phenylene diamine and terephthalic acid dihalide dissolved in a medium of at least one solvent selected from the group consisting of N-methyl-2-pyrrolidone containing calcium chloride in an amount of 1.5% or more but less than 5% based on the weight of the N-methyl-2-pyrrolidone, and dimethylacetamide, N-methyl-caprolactam and tetramethylurea respectively containing calcium chloride in an amount of 1.5% to 8% based on the weight of the respective solvent compound, and kneading said polymerization mixture, after the viscosity of said polymerization mixture reaches between 500 and 10,000 poises as determined by a falling-ball viscometer, until the logarithmic viscosity of the resultant polymer reaches from about 4.3 to 8.8, said logarithmic viscosity being determined by using a 0.5 g/dl solution of said polymer in 98.5% sulfuric acid at 30° C.

* * * * *

UNITED STATES PATENT AND TRADEMARK OFFICE
CERTIFICATE OF CORRECTION

PATENT NO. : 4,172,938

DATED : Oct. 30, 1979

INVENTOR(S) : Hiroshi Mera, et al

It is certified that error appears in the above—identified patent and that said Letters Patent is hereby corrected as shown below:

Column 2, line 38: "extend" should be --extent--.

Column 6, line 28: "thausands" should be --thousands--.

Signed and Sealed this

Third Day of June 1980

[SEAL]

Attest:

SIDNEY A. DIAMOND

*Attesting Officer*  *Commissioner of Patents and Trademarks*